(12) United States Patent
Beaulieu et al.

(10) Patent No.: US 6,279,412 B1
(45) Date of Patent: Aug. 28, 2001

(54) CORROSION RESISTANT EXOSKELETON ARM LINKAGE ASSEMBLY

(75) Inventors: David R. Beaulieu, Groton, MA (US); Robert T. Caveney, Windham, NH (US); Tuan Ha, Dedham, MA (US)

(73) Assignee: Brooks Automation, Inc., Chelmsford, MA (US)

( * ) Notice: Subject to any disclaimer, the term of this patent is extended or adjusted under 35 U.S.C. 154(b) by 0 days.

(21) Appl. No.: 09/314,654

(22) Filed: May 19, 1999

(51) Int. Cl.$^7$ .................................................. B25J 19/00
(52) U.S. Cl. ................................. 74/490.01; 901/49
(58) Field of Search ........................... 74/490.01; 901/27, 901/49

(56) References Cited

U.S. PATENT DOCUMENTS

| 4,904,514 | * | 2/1990 | Morrison et al. ........................ 901/49 |
| 4,931,617 | * | 6/1990 | Toyoda et al. ........................... 901/42 |
| 5,038,488 | * | 8/1991 | Abramowsky et al. ................ 901/49 |
| 6,039,068 | * | 3/2000 | Tessier et al. ........................... 901/49 |
| 6,082,290 | * | 7/2000 | Conlin ..................................... 901/49 |

FOREIGN PATENT DOCUMENTS

| 63-65973 | * | 3/1988 | (JP) . |
| 63-162188-A | * | 7/1988 | (JP) . |
| 3-287395 | * | 12/1991 | (JP) . |
| 8-281580 | * | 10/1996 | (JP) . |
| 9-94791-A | * | 4/1997 | (JP) . |
| 11-33973 | * | 2/1999 | (JP) . |
| 11-347982 | * | 12/1999 | (JP) . |
| 87/02927 | * | 5/1987 | (WO) .................................... 901/49 |
| WO 99/08841 | | 2/1999 | (WO) . |

* cited by examiner

Primary Examiner—David A. Bucci
Assistant Examiner—William C Joyce
(74) Attorney, Agent, or Firm—Perman & Green, LLP (57) ABSTRACT

A system for shielding a robot arm against being splashed with fluids comprises a protective shell-like cover of thin-walled plastic material impervious to fluids which is removably attached to the robot arm. The protective cover has a contoured shape generally conforming to the configuration of the robot arm and includes an upper member overlying the upwardly facing surfaces of the robot arm and an integral continuous side member proximally overlying the sidewall of the robot arm and extending to a lower rim generally coplanar with the downwardly facing surfaces of the robot arm. The upper member of the protective cover generally overlies the upwardly facing surface of the robot arm while the peripherally extending sidewall generally overlies the outwardly facing surface of the peripherally extending sidewall. In similar fashion, a protective plate of thin-walled plastic material impervious to fluids may also be removably attached to the downwardly facing surfaces of the robot arm and includes a peripheral rim generally coextensive with the peripherally extending sidewall of the link and proximate the lower rim of the protective cover when both the protective cover and the protective plate are so attached. With this construction, any splashing issuing from any direction and directed toward the robot arm is caused to impinge upon the protective cover and the protective plate thereby protecting the link of the robot arm to which it is attached.

16 Claims, 5 Drawing Sheets

CORROSION RESISTANT EXOSKELETON ARM LINKAGE ASSEMBLY

BACKGROUND OF THE INVENTION

1. Field of the Invention

The present invention relates generally to the protection of robot arms exposed to corrosive atmospheres and, more particularly, to a system for congruently encapsulating the links of a multi-link robot arm with thin plastic corrosion resistant covers.

2. Description of the Prior Art

Some robots devices that handle semiconductor wafers are required work in atmospheric environments that contain highly corrosive fluids (gaseous or liquid). These robotic devices require protection from the corrosive agents to improve overall performance of the product. If corrosion occurs, the arm members can generate particles that can lead to failures on the wafers being handled. One solution to this problem is to use materials that resist corrosion (i.e. 300 series stainless steel or coatings). In the case of robotic linkages, some designers have fabricated the arm members out of electro-polished stainless steel to improve corrosion resistance or prevent corrosive from occurring. Other designers have sprayed coatings on the structural materials to help isolate the corrosive agents from interacting with the base structural material thereby minimizing corrosion. The issues associated with these two solutions are cost of the material, the uniformity of the coatings and the ability of the material to resist permeation of the corrosive agents.

It was with knowledge of the foregoing state of the technology that the present invention has been conceived and is now reduced to practice.

SUMMARY OF THE INVENTION

To solve the problem just related, the inventors have developed a technology to cover the arm links with thin plastic covers. These covers encapsulate each link of the robot arm enabling less expensive materials to be used for the structural members so the arm links without diminishing the operational capability of the robot arm. In another manner of speaking, a system is provided for shielding a robot arm against being splashed with fluids and comprises a protective shell-like cover of thin-walled plastic material impervious to fluids which is removably attached to the robot arm. The protective cover has a contoured shape congruently conforming to the configuration of the robot arm and includes an upper member overlying the upwardly facing surfaces of the robot arm and an integral continuous side member proximally overlying the sidewall of the robot arm and extending to a lower rim generally coplanar with the downwardly facing surfaces of the robot arm. The upper member of the protective cover generally overlies the upwardly facing surface of the robot arm while the peripherally extending sidewall generally overlies the outer facing surface of the peripherally extending sidewall. In similar fashion, a protective plate of thin-walled plastic material impervious to fluids may also be removably attached to the downwardly facing surfaces of the robot arm and includes a peripheral rim generally coextensive with the peripherally extending sidewall of the link and proximate the lower rim of the protective cover when both the protective cover and the protective plate are so attached. With this construction, any splashing issuing from any direction and directed toward the robot arm is caused to impinge upon the protective cover and the protective plate thereby protecting the link of the robot arm to which it is attached.

A primary feature, then, of the present invention is the provision of a system for the protection of robot arms exposed to corrosive atmospheres.

Another feature of the present invention is the provision of such a system according to which the links of a multi-link robot arm are congruently encapsulated with thin plastic corrosion resistant covers.

Still another feature of the present invention is the provision of such a system using such thin plastic corrosion resistant covers which are disposable and easily replaced.

Yet another feature of the present invention is the provision of such a system which utilizes such thin plastic corrosion resistance covers which are inexpensive to manufacture, install, and replace.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and together with the description, serve to explain the principles of the invention in general terms. Like numerals refer to like parts throughout the disclosure.

DETAILED DESCRIPTION OF THE PREFERRED EMBODIMENT

Figure 1:
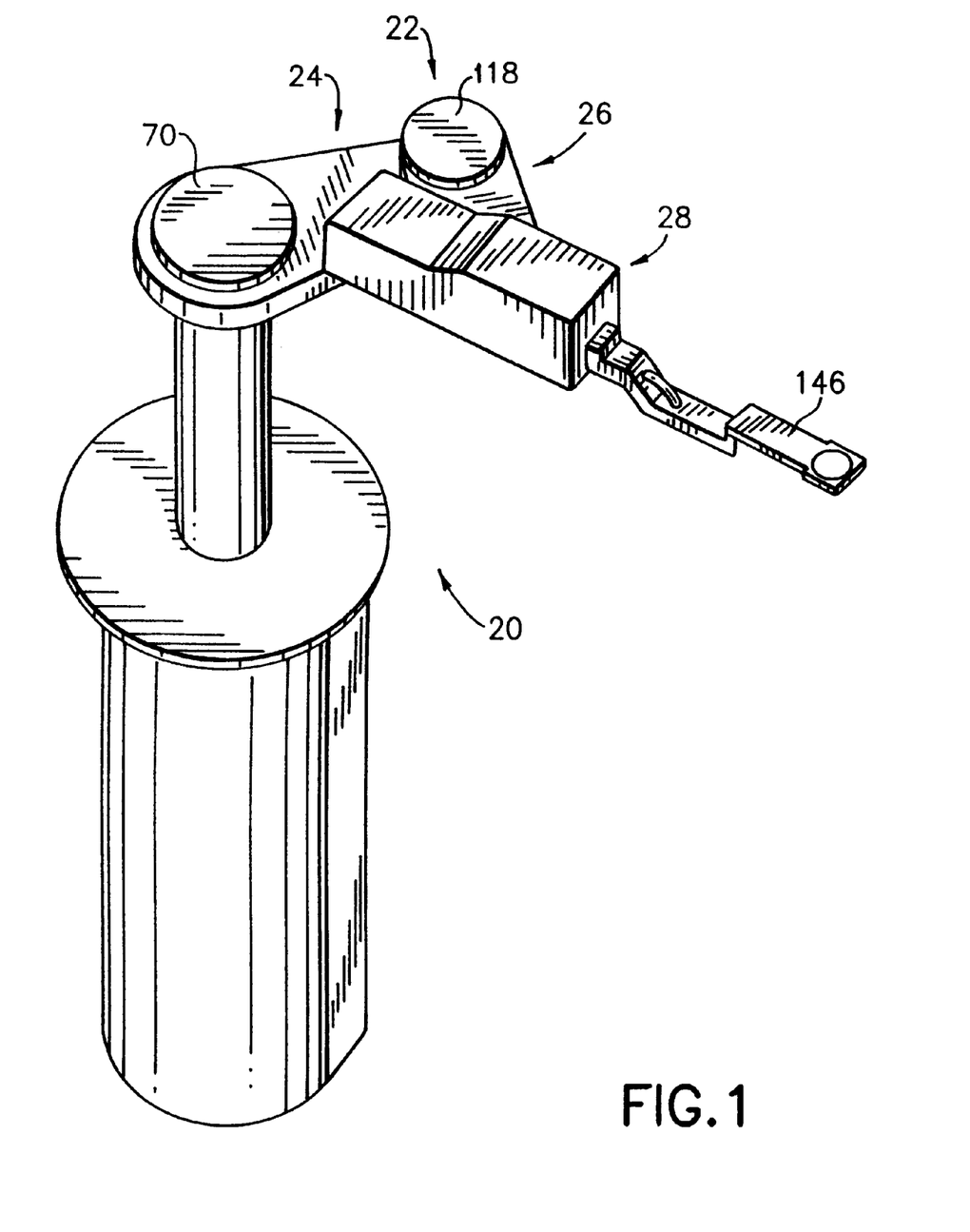
FIG. 1 is a perspective view of robot apparatus embodying the present invention.

Referring to FIG. 1, there is shown a perspective view of robot apparatus 20 incorporating features of the present invention. Although the present invention will be described with reference to the single embodiment shown in the drawings, it should be understood that the present invention can be embodied in many alternate forms. In addition, any suitable size, shape or type of elements or materials could be used.

In accordance with the invention, the robot apparatus 20 incorporates a system for shielding each link of multi-link robot arm 22 against being splashed with fluids ranging from water to highly toxic substances to which the apparatus may be subjected when handling workpieces such as semiconductor wafers, introducing them to processing chambers, then subsequently retrieving them.

Figure 2:
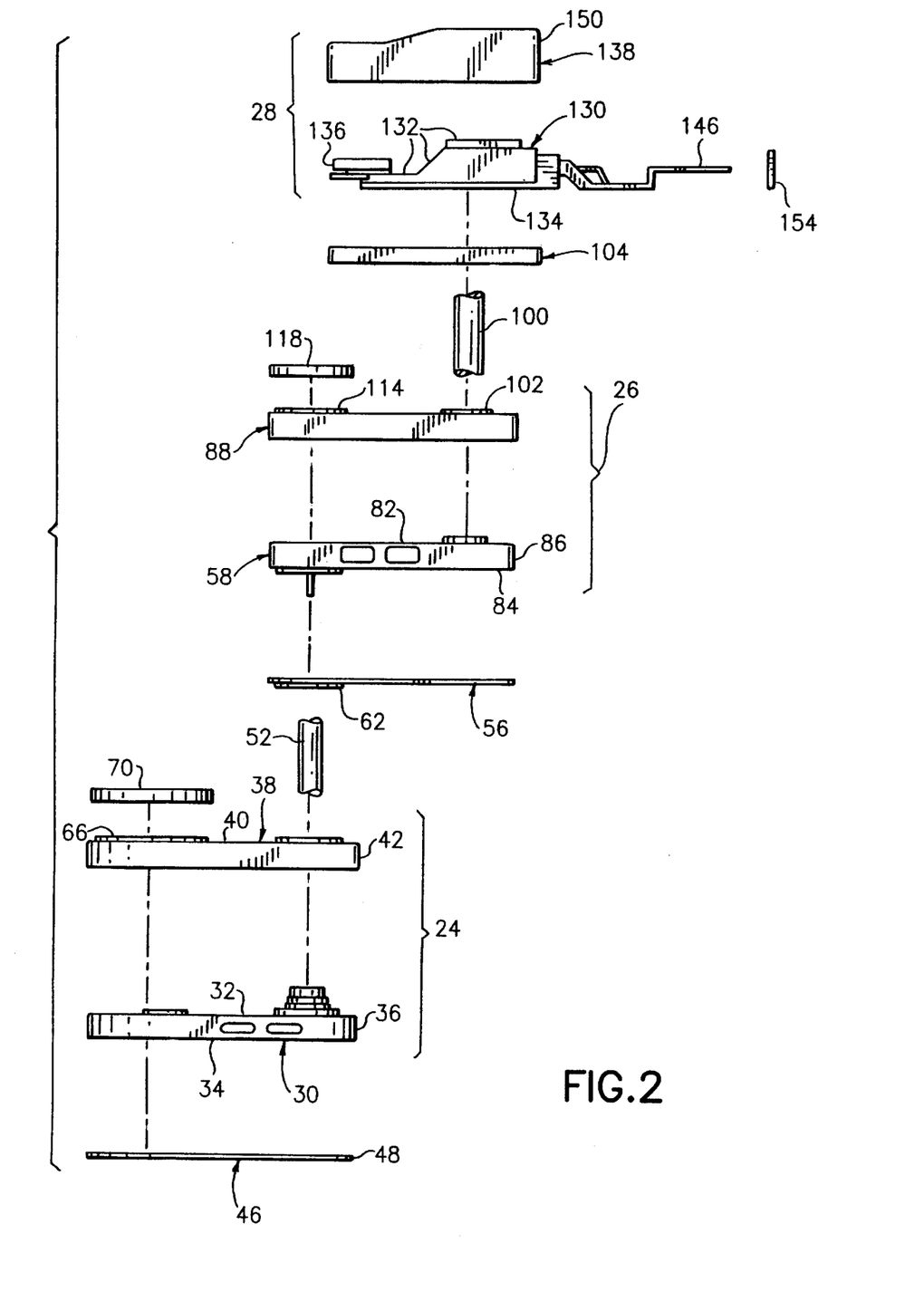
FIG. 2 is a side elevation view, exploded, of components illustrated in FIG. 1.
Figure 3:
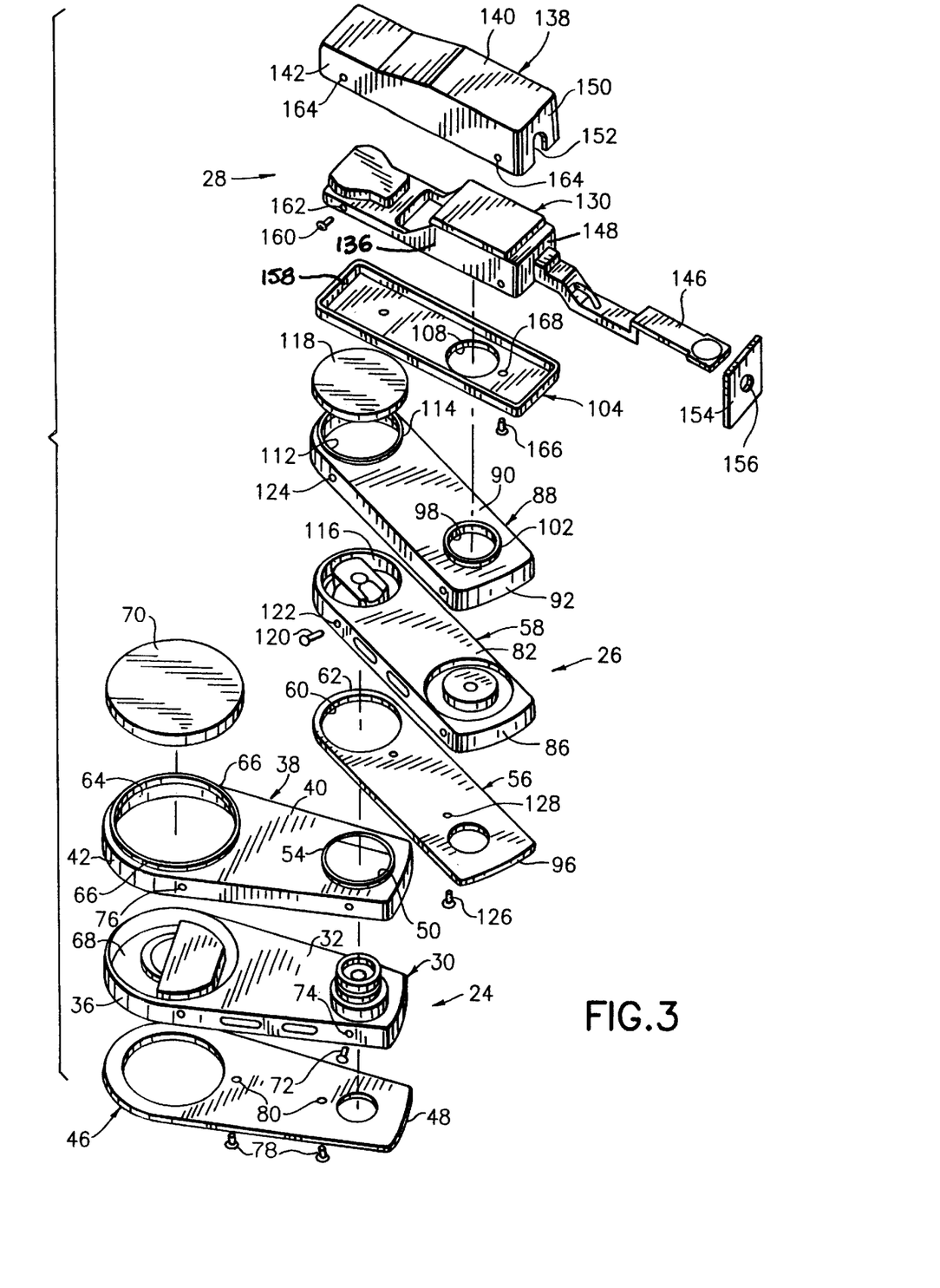
FIG. 3 is a perspective view, exploded, of the components illustrated in FIG. 2.
Figure 4:
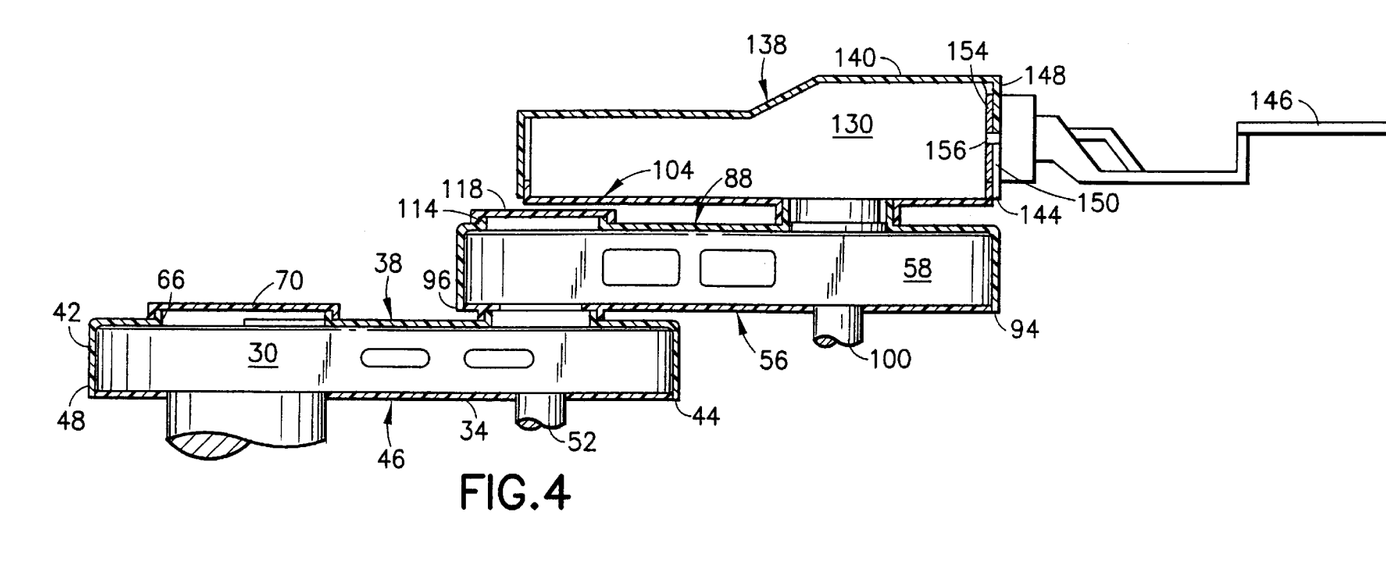
FIG. 4 is a side elevation view, partially cut away and in section, of the of components illustrated in FIGS. 2 and 3.

As seen more clearly in FIGS. 2, 3 and 4, the robot arm 22 is comprised of three distinct assemblies which can be functionally compared to the arm structure of a human being. Thus, the robot arm includes an upper arm assembly 24, a fore arm assembly 26, and a hand-wrist assembly 28. Although the assemblies 24, 26, and 28 are generally similar, in order to completely describe the invention, each assembly will be discussed separately.

Thus, the upper arm assembly 24 includes an upper arm link 30 having upwardly facing surfaces 32 and downwardly facing surfaces 34 and a peripherally extending sidewall having outwardly facing surfaces 36 extending between the upwardly and downwardly facing surfaces. The various surface 32, 34, 36 may be smooth and regular in some instances and may be highly contoured or irregular in other instances. The upper arm assembly 24 further includes a shielding system according to the invention which comprises a protective shell-like cover 38 of thin-walled plastic material impervious to fluids and adapted to be removably attached to the upper arm link 30. The protective cover 38 has a contoured shape congruently conforming to the configuration of the upper arm link 30 and includes an upper member 40 overlying the upwardly facing surfaces 32 of the link and an integral continuous side member 42 proximally overlying the outwardly facing surfaces 36 of the sidewall of the upper arm link and extending to a lower rim 44 projecting beyond a plane of the downwardly facing surfaces 34 of the link. The upper member 40 of the protective cover 38 generally overlies the upwardly facing surfaces 32 while the continuous side member 42 generally overlies the outwardly facing surfaces 36 of the peripherally extending sidewall.

With the protective cover 38 in place, any splashing of the upper arm link 30 issuing from an elevated location and directed toward the upper arm link is caused to impinge upon the protective cover thereby protecting the link.

Additionally, a protective plate 46 of thin-walled plastic material and impervious to fluids may also be provided for removable attachment to the downwardly facing surfaces 34 of the upper arm link 30. The protective plate 46 may be substantially planar and includes a peripheral rim 48 generally coextensive with the outwardly facing surfaces 36 of the peripherally extending sidewall of the upper arm link and proximate the lower rim 44 of the protective cover 38 when both the protective cover and the protective plate are attached thereto. With both the protective cover 38 and the protective plate 46 in place, any splashing of the upper arm link 30 issuing from any direction and directed toward the upper arm link is caused to impinge upon the protective cover and the protective plate thereby protecting the upper arm link. Together, the protective cover 38 and the protective plate 46 create a labyrinth seal at their overlapping regions which prevents the incursion of damaging fluids onto the surfaces of the upper arm link.

The protective cover 38 and the protective plate 46 are of any suitable low cost yet efficient plastic material having the necessary thickness to achieve the desired protection, yet not so think as to interfere with the operation of the robot arm 22. To this end, these components may by of blow molded construction having a thickness in the range of about 30 to 40 mils. A material which has been determined to be suitable for purposes of the invention is thermal formed plastic commercially available under the trademark NORYL™.

Figure 5:
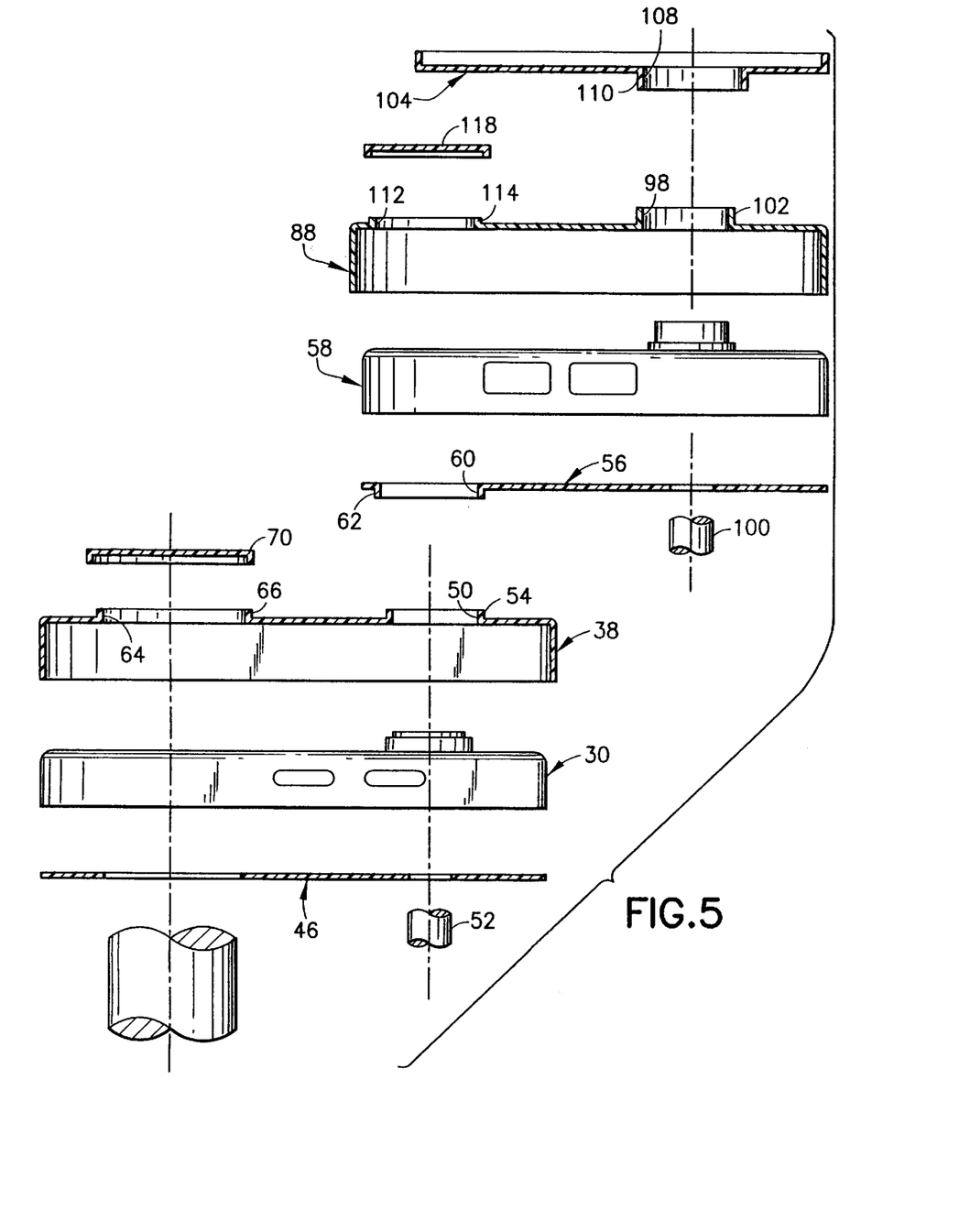
FIG. 5 is a detail side elevation view, in section and exploded, of some of the components illustrated in FIGS. 2, 3, and 4.

As seen most clearly in FIG. 5, the protective cover 38 attachable to the upper arm link 30 has an aperture 50 for freely receiving therethrough an operating shaft 52 and includes an upstanding lip 54 at the periphery of the aperture. A protective plate 56 is attached to a fore arm link 58 of the fore arm assembly 26 adjacent the upper arm link and has an aperture 60 generally coextensive with the aperture 50 for freely receiving therethrough the operating shaft 52 connecting the upper arm link 30 and the fore arm link 58 and includes a depending lip 62 at the periphery of the aperture 60. The depending lip 62 is proximate to, coaxial with, and has an opening, namely, aperture 60, which is only slightly greater in size than that of the upstanding lip 54 at the periphery of the aperture 50.

The protective cover 38 also has an access opening 64 with an upstanding lip 66 at the periphery of the aperture of the access opening for permitting entry from exterior regions to the interior 68 of the upper arm link 30. A cap 70 is releasably attachable to the lip 66 of the protective cover for covering the access opening when it is desired to isolate the interior 68 from the exterior regions.

As earlier mentioned, the protective cover 38 may be disposable and suitable fasteners 72 are provided for threaded engagement with associated tapped bores 74 in the upper arm link 30 and clearance bores 76 in the protective cover for releasably attaching the protective cover to the upper arm link. Similarly, fasteners 78 are provided for threaded engagement with associated tapped bores (not shown) in the downwardly facing surfaces 34 of the upper arm link 30 and clearance bores 80 in the protective plate 46 for releasably attaching the protective plate to the upper arm link. In this manner, upon the occurrence of sufficient deterioration, the protective cover and the protective plate can be removed from the upper arm link and replaced with a fresh protective cover. Of course, various other forms of attaching the protective cover 38 and the protective plate 46 to the upper arm link can be envisioned and are within the scope of the present invention.

Continuing with the description of the invention, the fore arm assembly 26 includes the fore arm link 58 having upwardly facing surfaces 82 and downwardly facing surfaces 84 and a peripherally extending sidewall having outwardly facing surfaces 86 and extending between the upwardly and downwardly facing surfaces. The various surfaces 82, 84, 86 may be smooth and regular in some instances and may be highly contoured or irregular in other instances. Similar to the upper arm assembly 24, the fore arm assembly 26 further includes a shielding system according to the invention which comprises a protective shell-like cover 88 of thin-walled plastic material impervious to fluids and adapted to be removably attached to the upper arm link 30. The protective cover 88 has a contoured shape congruently conforming to the configuration of the fore arm link 58 and includes an upper member 90 overlying the upwardly facing surfaces 82 of the link and an integral continuous side member 92 proximally overlying the outwardly facing surfaces 86 of the sidewall of the upper arm link and extending to a lower rim 94 projecting beyond a plane of the downwardly facing surfaces 84 of the link. The upper member 90 of the protective cover 88 generally overlies the upwardly facing surfaces 82 while the continuous side member 92 generally overlies the outer facing surfaces 86 of the peripherally extending sidewall.

With the protective cover 88 in place, any splashing of the fore arm link issuing from an elevated location and directed toward the fore arm link is caused to impinge upon the protective cover thereby protecting the link. Additionally, the protective plate 56, also of thin-walled plastic material and impervious to fluids may also be provided for removable attachment to the downwardly facing surfaces 84 of the fore arm link 58. The protective plate 56 may be substantially planar and includes a peripheral rim 96 generally coextensive with the outwardly facing surfaces 86 of the peripherally extending sidewall of the fore arm link and proximate the lower rim 94 of the protective cover 88 when both the protective cover and the protective plate are attached thereto. With both the protective cover 88 and the protective plate 56 in place, any splashing of the fore arm link 58 issuing from any direction and directed toward the upper arm link is cause to impinge upon the protective cover and the protective plate thereby protecting the upper arm link. Together, the protective cover 88 and the protective plate 56 create a labyrinth seal at their overlapping regions which prevents the incursion of damaging fluids onto the surfaces of the upper arm link.

Also as seen most clearly in FIG. 5, the protective cover 88 attachable to the fore arm link 58 has an aperture 98 for freely receiving therethrough an operating shaft 100 and includes an upstanding lip 102 at the periphery of the aperture. A protective plate 104 is attached to a hand-wrist link 130 of the hand-wrist assembly 28 and has an aperture 108 generally coextensive with the aperture 98 for freely receiving therethrough the operating shaft 100 connecting the hand-wrist link 130 and the fore arm link 58 and includes a depending lip 110 at the periphery of the aperture 108. The depending lip 110 is proximate to, coaxial with, and has an opening, namely, aperture 108, which is only slightly greater in size than that of the upstanding lip 102 at the periphery of the aperture 108.

The protective cover 88 also has an access opening 112 with an upstanding lip 114 at the periphery of the aperture of the access opening for permitting entry from exterior regions to the interior 116 of the fore arm link 58. A cap 118 is releasably attachable to the lip 114 of the protective cover for covering the access opening when it is desired to isolate the interior 116 from the exterior regions.

As in the instance of the upper arm assembly 24, the protective cover 88 may be disposable and suitable fasteners 120 are provided for threaded engagement with associated tapped bores 122 in the fore arm link 58 and clearance bores 124 in the protective cover for releasably attaching the protective cover to the fore arm link. Similarly, fasteners 126 are provided for threaded engagement with associated tapped bores (not shown) in the downwardly facing surfaces 84 of the fore arm link 58 and clearance bores 128 in the protective plate 56 for releasably attaching the protective plate to the fore arm link. In this manner, upon the occurrence of sufficient deterioration, the protective cover and the protective plate can be removed from the fore arm link and replaced with a fresh protective cover. Of course, as with the upper arm assembly 24, various other forms of attaching the protective cover 88 and the protective plate 56 to the fore arm link 58 can be envisioned and are within the scope of the present invention.

Thus, the hand-wrist assembly 28 includes the hand-wrist link 130 having upwardly facing surfaces 132 and downwardly facing surfaces 134 and a peripherally extending sidewall having outwardly facing surfaces 136 and extending between the upwardly and downwardly facing surfaces. The various surface 132, 134, 136 may be smooth and regular in some instances and may be highly contoured or irregular in other instances. The hand-wrist assembly 28 further includes a shielding system according to the invention which comprises a protective shell-like cover 138 of thin-walled plastic material impervious to fluids and adapted to be removably attached to the hand-wrist link 130. The protective cover 138 has a contoured shape congruently conforming to the configuration of the hand-wrist link 106 and includes an upper member 140 overlying the upwardly facing surfaces 132 of the link and an integral continuous side member 142 proximally overlying the outwardly facing surfaces 136 of the sidewall of the upper arm link and extending to a lower rim 144 projecting beyond a plane of the downwardly facing surfaces 134 of the link. The upper member 140 of the protective cover 138 generally overlies the upwardly facing surfaces 132 while the continuous side member 142 generally overlies the outer facing surfaces 136 of the peripherally extending sidewall.

To accommodate an end effector 146 which projects from a terminal end 148 of the hand-wrist link 130, a corresponding end plate 150 of the protective cover 138 if formed with a notch 152 to closely receive the end effector 146 and allow it to project beyond the protective cover. As further assurance for the fluid tight integrity of the encapsulating system of the invention, a guard plate 154 is provided with a reception hole 156 of sufficient size to freely receive the end effector 146. When the protective cover 138 is in place, the guard plate is sandwiched between the terminal end 148 and the end plate 150 and overlies the notch 152 thereby protecting the hand-wrist link while not interfering with the operation of the end effector 146.

With the protective cover 138 in place, any splashing of the hand-wrist link 130 issuing from an elevated location and directed toward the hand-wrist link is caused to impinge upon the protective cover thereby protecting the link.

Additionally, the protective plate 104, previously mentioned, of thin-walled plastic material and impervious to fluids may also be provided for removable attachment to the downwardly facing surfaces 134 of the hand-wrist link 106. The protective plate 104 may be substantially planar and includes a peripheral rim 158 generally coextensive with the outwardly facing surfaces 136 of the peripherally extending sidewall of the hand-wrist link and proximate the lower rim 144 of the protective cover 138 when both the protective cover and the protective plate are attached thereto. With both the protective cover 138 and the protective plate 104 in place, any splashing of the hand-wrist link 106 issuing from any direction and directed toward the hand-wrist link is caused to impinge upon the protective cover and the protective plate thereby protecting the hand-wrist link. Together, the protective cover 138 and the protective plate 104 create a labyrinth seal at their overlapping regions which prevents the incursion of damaging fluids onto the surfaces of the hand-wrist link.

As mentions above with respect to the upper arm assembly 24 and the fore arm assembly 26, the protective cover 138 and the protective plate 104 for the hand-wrist assembly are of any suitable low cost yet efficient plastic material having the necessary thickness to achieve the desired protection yet not so thick as to interfere with the operation of the robot arm 22. These components may be of the construction and material mentioned above.

As with the protective covers 38 and 88, the protective cover 138 may be disposable and suitable fasteners 160 are provided with associated tapped bores 162 in the hand-wrist link 106 and clearance bores 164 in the protective cover for releasably attaching the protective cover to the hand-wrist link. Similarly, fasteners 166 are provided with associated tapped bores (not shown) in the downwardly facing surfaces 134 of the hand-wrist link 130 and clearance bores 168 in the protective cover for releasably attaching the protective plate 104 to the hand-wrist link. In this manner, upon the occurrence of sufficient deterioration, the protective cover and the protective plate can be removed from the hand-wrist link and replaced with a fresh protective cover. Of course, various other forms of attaching the protective cover 138 and the protective plate 104 to the hand-wrist link can be envisioned and are within the scope of the present invention.

While preferred embodiments of the invention have been disclosed in detail, it should be understood by those skilled in the art that various other modifications may be made to the illustrated embodiments without departing from the scope of the invention as described in the specification and defined in the appended claims.

What is claimed is:

1. A system for shielding each link of a multi-link robot arm against being splashed with fluids, each link including upwardly facing surfaces and downwardly facing surfaces and a peripherally extending sidewall having outwardly facing surfaces and extending between the upwardly and downwardly facing surfaces, the shielding system comprising:

a protective cover of thin-walled plastic material impervious to fluids adapted to be removably attached to each link of the robot arm, the protective cover having a contoured shape congruently conforming to the configuration of a link and including an upper member proximally overlying the upwardly facing surfaces of the link and an integral continuous side member proximally overlying the sidewall of the link and extending to a lower rim projecting beyond a plane of the downwardly facing surfaces of the link, the upper member of the protective cover generally overlying the upwardly facing surface, the continuous extending side member generally overlying the outwardly facing surfaces of the peripherally extending sidewall; and a protective plate of thin-walled plastic material impervious to fluids adapted to be removably attached to the downwardly facing surfaces of each link of the robot arm, the protective plate including a peripheral rim generally coextensive with the peripherally extending sidewall of the link and proximate the lower rim of the protective cover when both the protective cover and the protective plate are attached thereto;

the protective cover and the protective plate having mutually overlapping regions forming a labyrinth seal;

whereby any splashing of the robot arm issuing from any direction and directed toward the robot arm is caused to impinge upon the protective cover and the protective plate thereby protecting the link of the robot arm to which it is attached.

2. A shielding system as set forth in claim 1, wherein the protective cover is removable; and including:

fastener means for releasably attaching the protective cover to the link, whereby upon the occurrence of sufficient deterioration, the protective cover can be removed from the link and replaced with a fresh protective cover.

3. A shielding system as set forth in claim 1, wherein the protective cover is attached to one link and has a first aperture for freely receiving therethrough an operating shaft and includes an upstanding lip at the periphery of the first aperture projecting to a location proximate the downwardly facing surface of the second link and with a protective plate.

4. A shielding system as set forth in claim 1 wherein the protective cover is attached to a first link and has a first aperture for freely receiving therethrough an operating shaft and includes an upstanding lip at the periphery of the first aperture, wherein the protective plate is attached to a second link adjacent the first link and has a second aperture generally coextensive with the first aperture for freely receiving therethrough an operating shaft connecting the first and second adjacent links and includes a depending lip at the periphery of the second aperture; and wherein the depending lip at the periphery of the second aperture is proximate to, coaxial with, and has an opening which is greater in size than that of the upstanding lip at the periphery of the first aperture.

5. A shielding system as set forth in claim 1 wherein the protective cover is attached to one link and has a first aperture for freely receiving therethrough an operating shaft and includes an upstanding lip at the periphery of the first aperture projecting to a location proximate the downwardly facing surface of the link.

6. A shielding system as set forth in claim 1 wherein the protective plate is substantially planar.

7. A shielding system as set forth in claim 1 wherein the protective shell-like cover has an access opening aligned with an opening in the link for permitting entry from exterior regions to the interior of the link and a cap attachable to the protective shell-like cover for releasably covering the access opening.

8. A shielding system as set forth in claim 4 wherein the upstanding lip projects into the first aperture.

9. A method of shielding each link of a multi-link robot arm against being splashed with fluids, each link including upwardly facing surfaces and downwardly facing surfaces and a peripherally extending sidewall having outwardly facing surfaces and extending between the upwardly and downwardly facing surfaces, the shielding method comprising the steps of:

(a) providing a protective shell-like cover of thin-walled plastic material impervious to the fluids, the protective cover having a contoured shape congruently conforming to the configuration of a link and including an upper member overlying the upwardly facing surfaces of the link and an integral continuous side member proximally overlying the sidewall of the link and extending to a lower rim projecting beyond a plane of the downwardly facing surfaces of the link, the protective cover being biased by its contoured shape such that with the upper member proximately overlying the upwardly facing surface, the continuous side member is caused to move into congruent engagement with the outwardly facing surfaces of the peripherally extending sidewall;

(b) providing a substantially protective plate of thin-walled plastic material impervious to the fluids adapted to be removably attached to the downwardly facing surfaces of each link of the robot arm, the protective plate including a peripheral rim generally coextensive with the peripherally extending sidewall of the link and proximate the lower rim of the protective cover when both the protective cover and the protective plate are attached thereto; and (c) removably attaching the protective shell-like cover to each link of the robot arm such that any splashing of the robot arm issuing from an elevated location and directed toward the robot arm is caused to impinge upon the protective cover thereby protecting the link of the robot arm to which it is attached.

10. A method as set forth in claim 9 including the steps of:

(d) providing the protective cover as a removable item; and (e) releasably attaching the protective cover to the link by fastener means whereby, upon the occurrence of sufficient deterioration, the protective cover can be removed from the link and replaced with a fresh protective cover.

11. A method as set forth in claim 9 including the steps of:

(d) providing the protective cover and the protective planar plate as removable items; and (e) releasably attaching the protective cover and the protective planar plate to the link by fastener means whereby, upon the occurrence of sufficient deterioration, the protective cover and the protective planar plate can be removed from the link and replaced with a fresh protective cover and with a fresh protective planar plate.

12. A system for shielding a robot arm against being splashed with fluids, the robot arm including upwardly facing surfaces and downwardly facing surfaces and a peripherally extending sidewall having outwardly facing surfaces and extending between the upwardly and downwardly facing surfaces, the shielding system comprising:

a protective shell-like cover of thin-walled plastic material impervious to the fluids adapted to be removably attached to the robot arm, the protective cover having a contoured shape congruently conforming to the configuration of the robot arm and including an upper member overlying the upwardly facing surfaces of the robot arm and an integral continuous side member proximally overlying the sidewall of the robot arm and extending to a lower rim projecting beyond a plane of the downwardly facing surfaces of the robot arm, the protective cover being biased by its contoured shape such that with the upper member proximately overlying the upwardly facing surface, the continuous side member is caused to move into congruent engagement with the outwardly facing surfaces of the peripherally extending sidewall; and a protective plate of thin-walled plastic material impervious to the fluids adapted to be removably attached to the downwardly facing surfaces of the robot arm, the protective plate including a peripheral rim generally coextensive with the peripherally extending sidewall of the robot arm and proximate the lower rim of the protective cover when both the protective cover and the protective plate are attached thereto;

the protective cover and the protective plate having mutually overlapping regions forming a labyrinth seal whereby any splashing of the robot arm issuing from any direction and directed toward the robot arm is caused to impinge upon the protective cover thereby protecting the robot arm to which it is attached.

13. A shielding system as set forth in claim 12 wherein the protective cover is removable; and including:

fastener means for releasably attaching the protective cover to the robot arm, whereby upon the occurrence of sufficient deterioration, the protective cover can be removed from the robot arm and replaced with a fresh protective cover.

14. A shielding system as set forth in claim 12 including:

a substantially protective planar plate of thin-walled plastic material impervious to the fluids adapted to be removably attached to the downwardly facing surfaces of each link of the robot arm, the protective plate including a peripheral rim generally coextensive with the peripherally extending sidewall of the link and proximate the lower rim of the protective cover when both the protective cover and the protective plate are attached thereto;

wherein both the protective cover and the protective planar plate are removable; and including:

fastener means for releasably attaching the protective cover and the protective planar plate to the robot arm whereby, upon the occurrence of sufficient deterioration, the protective cover and the protective planar plate can be removed from the robot arm and replaced with a fresh protective cover and with a fresh protective plate.

15. A shielding system as set forth in claim 12 wherein the protective planar plate is substantially planar.

16. A shielding system as set forth in claim 12 wherein the protective shell-like cover has an access opening aligned with an opening in the link for permitting entry from exterior regions to the interior of the link through the opening in the link and a cap attachable to the protective shell-like cover for releasably covering the access opening.

\* \* \* \* \*